United States Patent
Bose et al.

(10) Patent No.: US 9,233,862 B2
(45) Date of Patent: Jan. 12, 2016

(54) OIL EMULSIFICATION AND POLYCYCLIC AROMATIC HYDROCARBON ADSORPTION USING FINE PARTICLES AS DISPERSANTS

(75) Inventors: Arijit Bose, Lexington, MA (US); Vijay T. John, Destrehan, LA (US); Ani Tzankova Nikova, Winchester, MA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 14/131,323

(22) PCT Filed: Jul. 10, 2012

(86) PCT No.: PCT/US2012/046057
§ 371 (c)(1),
(2), (4) Date: Jan. 7, 2014

(87) PCT Pub. No.: WO2013/009744
PCT Pub. Date: Jan. 17, 2013

(65) Prior Publication Data
US 2014/0166575 A1    Jun. 19, 2014

Related U.S. Application Data

(60) Provisional application No. 61/506,532, filed on Jul. 11, 2011.

(51) Int. Cl.
*C02F 1/68*    (2006.01)
*C09K 3/32*    (2006.01)
*C02F 1/28*    (2006.01)
*C02F 3/00*    (2006.01)
*C02F 3/34*    (2006.01)

(52) U.S. Cl.
CPC . *C02F 1/68* (2013.01); *C02F 1/281* (2013.01); *C02F 3/00* (2013.01); *C09K 3/32* (2013.01); *C02F 1/681* (2013.01); *C02F 3/343* (2013.01)

(58) Field of Classification Search
USPC .................................. 210/925, 671, 691, 694
See application file for complete search history.

(56) References Cited

U.S. PATENT DOCUMENTS

| | | | | |
|---|---|---|---|---|
| 2,867,540 | A | * | 1/1959 | Harris ........................... 106/476 |
| 4,311,830 | A | | 1/1982 | Gutnik |
| 5,342,525 | A | | 8/1994 | Rowsell |
| 5,554,739 | A | | 9/1996 | Belmont |
| 5,922,118 | A | * | 7/1999 | Johnson et al. ............... 106/31.6 |

(Continued)

OTHER PUBLICATIONS

Tryba, B., et a., "Influence of chemically prepared H2SO4-graphite intercalation compound (GIC) precursor on parameters of exfoliated graphite (EG) for oil sorption from water," Carbon 41 (2002) p. 2009-2025.*

(Continued)

*Primary Examiner* — Chester Barry

(57) ABSTRACT

A method for cleaning an oil spill in a marine environment includes forming a particle-stabilized emulsion containing seawater, carbon black and at least one oil spill component and allowing the at least one oil spill component to degrade, thereby removing said component from the marine environment. Carbon black can be added to an oil-seawater mixture to form a stabilized emulsion containing at least one oil spill component and the oil spill component allowed to degrade, thereby removing the at least one oil spill component from the oil spill. Also disclosed is an emulsion that includes one or more oil spill components, seawater and carbon black particles.

25 Claims, 2 Drawing Sheets

(56) References Cited

U.S. PATENT DOCUMENTS

| | | | |
|---|---|---|---|
| 5,939,086 A | 8/1999 | Levy | |
| 5,998,531 A * | 12/1999 | Aimura et al. | 524/495 |
| 6,451,100 B1 | 9/2002 | Karl et al. | |
| 6,471,763 B1 | 10/2002 | Karl | |
| 6,503,311 B1 | 1/2003 | Karl et al. | |
| 7,300,964 B2 | 11/2007 | Niedermeier et al. | |
| 7,811,540 B2 | 10/2010 | Adams | |
| 7,922,805 B2 | 4/2011 | Kowalski | |
| 2008/0070146 A1 | 3/2008 | Fomitchev et al. | |
| 2009/0054272 A1 | 2/2009 | Prud'homme et al. | |
| 2010/0009280 A1 | 1/2010 | Liu et al. | |
| 2010/0096595 A1 * | 4/2010 | Prud'Homme et al. | 252/500 |
| 2010/0215961 A1 * | 8/2010 | Aubry et al. | 428/403 |
| 2010/0243248 A1 * | 9/2010 | Golomb et al. | 166/270 |
| 2010/0269732 A1 * | 10/2010 | Sekiyama | 106/31.9 |
| 2011/0244382 A1 | 10/2011 | Christopher et al. | |
| 2012/0142111 A1 * | 6/2012 | Tour et al. | 436/27 |

OTHER PUBLICATIONS

Tryba, B., eta., "Influence of chemically prepared H2SO4-graphite intercalation compound (GIC) precursor on parameters of exfoliated graphite (EG) for oil sorption from water," Carbon 41 (2002) p. 2009-2025.*

Inagaki, M., et al., "Exfoliated graphite for spilled oil recovery," Carbon Science vol. 2, No. 1 (2001), p. 1-8.*

Asadpour, R., et al., "Application of Sorbent materials in Oil Spill management: A review," Caspian Journal of Applied Sciences Research, 2(2), pp. 46-58 (2013), www.cjasr.com.*

Gelot A., et al., "Emulsification of Oil and Water in the Presence of Finely Divided Solids and Surface-Active Agents", Colloids and Surfaces, vol. 12, pp. 271-303, 1984.

Lee, Richard F., "Agents Which Promote and Stabilize Water-in-Oil Emulsions", Spill Science & Technology Bulletin, vol. 5, No. 2, pp. 117-126, 1999.

Tambe, D. E., et al., "Factors Controlling the Stability of Colloid-Stabilized Emulsions", Journal of Colloid and Interface Science, vol. 157, pp. 244-253, 1993.

International Search Report and the Written Opinion of the International Searching Authority, or the Declaration of International Application No. PCT/US2012/046057, mailed on Dec. 5, 2012.

International Preliminary Report on Patentability of International Application No. PCT/US2012/046057, mailed on Jun. 20, 2013. PCT/US2012/046057, mailed on Jun. 20. 2013.

* cited by examiner

OIL EMULSIFICATION AND POLYCYCLIC AROMATIC HYDROCARBON ADSORPTION USING FINE PARTICLES AS DISPERSANTS

RELATED APPLICATIONS

This application is a §371 national phase application of and claims priority to International Patent Application No. PCT/US2012/046057, filed on Jul. 10, 2012, which claims priority to U.S. Provisional Patent Application No. 61/506,532 filed on Jul. 11, 2011.

BACKGROUND OF THE INVENTION

Marine oil spills, the release of oil into ocean or coastal waters, often occur when oil tankers, underwater pipelines, offshore oil rigs, or offshore oil wells are damaged, resulting in a breach of oil containment. As the oil is released from its source, it forms a film, or oil slick, on the surface of the water that expands horizontally. The rate of expansion of the oil slick is governed by factors such as the viscosity, surface tension and specific gravity of the oil.

Marine oil spills are a major environmental concern. Oil spills both physically smother marine life with a coating that is difficult to remove and expose it to toxic substances contained within the oil. These toxic substances then enter the food chain and become harmful to marine life not directly contacted by the oil spill, having far reaching implications for the entire marine ecosystem. Oil spills further impact the marine ecosystem by blocking the entry of sunlight into marine waters, reducing photosynthesis of marine plants and phytoplankton. Over time, this also can have far reaching effects on the marine food chain.

One example of the dramatically harmful effect of oil spills on marine organisms is the effect of oil spills on marine birds. When birds are physically exposed to the oil, their feathers become matted, leaving them unable to fly and susceptible to drowning due to decreased buoyancy. They also have reduced insulation capacity. When the birds preen, they ingest the toxins present in the oil. The toxins can cause damage to multiple organ systems and ingestion typically results in death. Even if the marine birds do not directly come into contact with the oil spill, local prey fish populations may become contaminated with the toxins in the oil, again causing the birds to ingest the toxins and become ill.

Because of the harmful and far-reaching effects of oil spills on the marine environment, it is critical to clean spills as thoroughly and as quickly as possible. Current methods for cleaning oil spills include traditional methods of mechanically containing and removing the spill and more recent chemical and biological approaches.

Traditional methods for cleaning oil spills require first physically containing the spill. This is usually done by surrounding the spill with a series of booms. Booms are flotation devices that include both above and below-water projections to contain the oil. Once the contaminated water is contained, it is removed using one of several methods.

One option is to use a skimmer, a device for mechanically recovering the oil layer from the water surface. A second option is the use of sorbents. Sorbents are dry materials that soak up the oil, resulting in a semi-solid mixture that facilitates oil collection. Yet another option is controlled burning of the oil layer off of the water surface.

The main drawback of mechanical methods for cleaning oil spills is that they are most effective in calm waters. When seas are rough, waves carry oil over the booms, allowing it to escape into the surrounding environment. Skimmers are no longer effective in rough waters. Controlled burning must also be done in calm seas.

More recent innovations in cleaning oil spills include biological and chemical approaches. The main biological approach is bioremediation. If an oil spill is left untreated, biodegradation will eventually occur, typically in a process by which microorganisms break down the oil as they consume it for nutrients. Bioremediation is a series of techniques for speeding up this process, either by adding nutrients to the environment to speed up the oil-degrading activity of existing microorganisms, or by adding additional oil-degrading microorganisms to the environment. While bioremediation is a valuable technique, it is a long-term process that is often employed after other methods of oil spill clean-up have been exhausted, rather than a replacement for other methods.

The use of dispersing agents is a chemical approach for breaking up oil spills. Generally, dispersants are chemical compounds containing surfactants. They function by stabilizing oil droplets that form when the seawater and oil are mixed rapidly. These droplets remain dispersed in the water column, where they are then degraded by natural processes such as bioremediation. Although the oil is not physically removed from the marine environment, smaller oil droplets scattered by currents cause far less harm and degrade more easily than an oil slick. When spills occur below the sea surface, subsurface dispersants can be applied before the oil reaches the surface. Although an effective method for dispersing an oil spill, there are several concerns with the current use of dispersants. One concern relates to the (premature) release of the surfactant from the oil, before degradation has occurred. Another concern relates to the toxicity of many existing dispersants, further endangering the marine environment. Also, the dispersant is diluted into such a large volume it can be difficult to achieve a threshold concentration necessary for the droplets to be stabilized; even if formed, the emulsion will tend to destabilize due to low background concentrations caused by dilution. And in many cases, surfactants used are not 'active' for polycyclic aromatic hydrocarbons.

SUMMARY OF THE INVENTION

A need exists, therefore, for oil spill clean-up techniques that reduce or minimize the problems discussed above.

The invention generally relates to the use of carbon blacks, optionally in combination with other particles, in the treatment of oil spills.

In one aspect, a method for cleaning an oil spill in a marine environment comprises forming a particle-stabilized emulsion containing seawater, carbon black and at least one oil spill component; and allowing the at least one oil spill component to degrade, or the oil spill component to be consumed by microorganisms such as bacteria, thereby removing said component from the marine environment.

In another aspect, a method for treating an oil spill comprises adding carbon black to an oil-seawater mixture to form a stabilized emulsion containing at least one oil spill component; and allowing the at least one oil spill component to degrade, thereby removing the at least one oil spill component from the oil spill.

In a further aspect, an emulsion comprises one or more oil spill components, seawater and carbon black particles.

In yet another aspect, a method for preparing a particle stabilized emulsion comprises combining surface modified or oxidized carbon black particles with oil and seawater to form oil droplets in the seawater.

Practicing the invention has many advantages and many of the techniques described herein can replace or can be used in conjunction with surfactant-based dispersants. Use of high specific surface area, fine particles as emulsifying agents can efficiently serve multiple roles. First, the particle emulsifiers described herein can produce very stable oil-in-seawater emulsions because the free energy of particle desorption from an oil/water interface can be tuned to be at least thousands of kT/particle. Furthermore, the high specific surface area can promote adsorption of significant amounts of polycyclic aromatic hydrocarbons (the most toxic components) from the oil, thus retarding their dissolution into the surrounding seawater. In many instances the particles will keep the oil stably dispersed within the water column, delaying the oil from arriving at the ocean surface and then being transported by surface currents to the shore.

By targeting leaking oil at or close to its sub surface source, oil droplets can be emulsified and stabilized by use of the carbon black particles. The use of carbon black can generate oil (e.g., crude oil)-in-seawater emulsions that will stay in the water column, potentially for long enough to allow ocean bacteria to 'consume' both the carbon black and the oil. Furthermore, the effective density of the emulsion 'drop' can approach that of the surrounding seawater, thus reducing the buoyancy-driven motion of oil towards the surface. In some of its aspects, the invention stabilizes oil-in-seawater emulsions in the water column for at least one to two months and reduces partitioning of polycyclicaromatic hydrocarbons (PAH) into seawater (for instance, by about 5-30%).

The above and other features of the invention including various details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
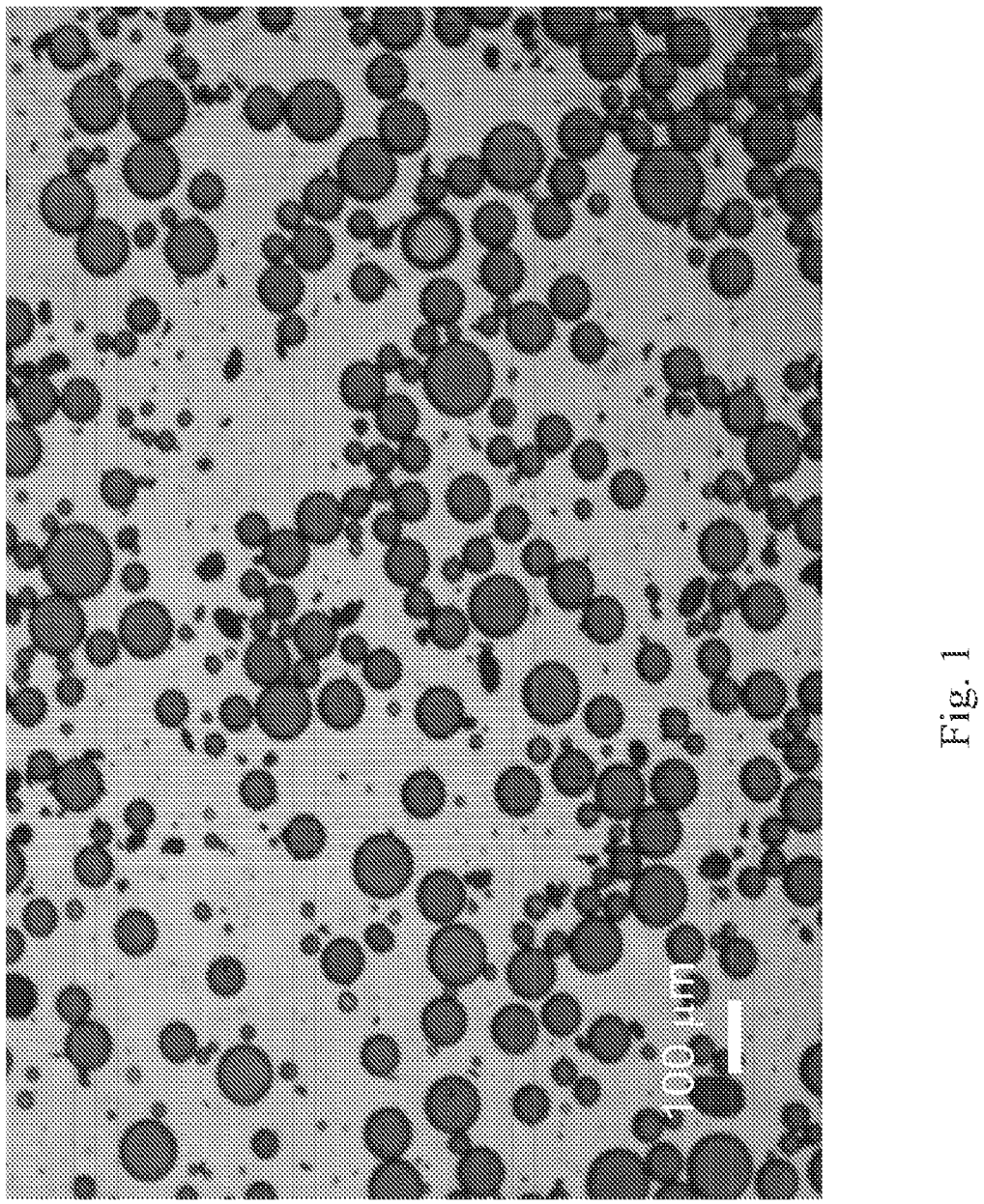
FIG. 1 is an optical micrograph showing an octane-in-water emulsion stabilized by carbon black.

The invention generally relates to a method for treating or cleaning oil spills from a marine environment. As used herein, a marine environment refers to any aqueous environment where the water is primarily sea water, such as found in oceans or seas, including both coastal and open sea types, salt water lakes, deltas, estuaries, lagoons, seawater pools, ponds and so forth.

Marine environments can vary considerably. Throughout the world, for example, ocean or sea temperatures can range from nearly freezing at the poles to almost 100° F. in shallow coastal waters in the tropics. Marine depths range from negligible along the shore line to depths of approximately 36,000 feet at the deepest part of the ocean. Pressure varies along with depth and typically increases by 1 bar (14.7 psi) at every 33 feet below the surface of the water.

Despite the varied marine environments, the composition of seawater remains relatively constant and the majority of seawater in the world has a salinity of between 3.1 and 3.8% of dissolved salts. Sodium chloride is the most abundant salt in seawater, accounting for 78 to 90% of dissolved salt in seawater. In addition to sodium and chlorine ions, seawater can contain magnesium, calcium and potassium cations, sulfate ($SO_4$), bromine, fluorine anions, as well as small quantities of other ionic or nonionic chemical substances. Salinity may be lower in deltas or estuaries. As used herein, the term "seawater" describes an aqueous solution that contains at least 2%, for example, at least 3% dissolved salts, e.g., within the range of from about 2% to about 5%.

Typically, the density of surface seawater ranges from about 1.020 to 1.029 kg/m3 and typically depends on temperature and salinity. Deep in the ocean, under high pressure, seawater can reach a density of 1.050 kg/m3 or higher. Seawater pH is generally reported to be within the range of from about 7.5 to about 8.4.

The nature of oil spills in a marine environment can vary, depending on factors such as, for example, the depth of the spill, its source, composition, size, further physical, chemical or biochemical changes affecting the spill over time and so forth.

Sub-surface oil spills, for example, occur when underwater oil wells, underwater oil containment devices or conduits such as pipelines are damaged and leak oil into the surrounding marine environment.

Surface oil spills manifest themselves as a layer of oil, or an oil slick, on top of the seawater. In some cases, surface oil spills occur when oil is spilled directly onto the surface of the water, for example, when oil tankers become damaged and leak their oil supply into the surrounding marine environment. In other cases, surface oils spills are generated by subsurface oil spills. For instance, if a sub-surface spill is not immediately or effectively contained, oil released from the sub-surface source floats to the surface of the water forming an oil slick.

Typically, oil spills involve crude oils, heavy fuel oils, petroleum products and the like. Crude oils are mixtures of many different compounds, mostly hydrocarbons, and typically include light-, medium-, and heavy-weight components. Crude oil hydrocarbons range from linear hydrocarbons such as octane, small-ringed benzene, toluene, xylene, kerosene, and naphthalene, to larger molecules that float on the surface of the water and can become solids (e.g., tar) during evaporation or distillation. To form petroleum products, crude oil is processed (e.g., in a refinery) to separate gases and liquids (gasoline, diesel, lubricating and heating oils) from solids (e.g., tar).

In many cases, crude and heavy fuel oils tend to be less toxic but are more persistent in the environment. In contrast, more toxic, refined petroleum products tend to disappear more readily from the environment. Examples of chemical compounds typically found in oil spills include but are not limited to low molecular weight aliphatics, aromatics such as benzene, toluene and the like, polynuclear aromatics and volatile components. Some specific substances are listed in Table 1 below (showing chemical name, CAS (Registry) number and molecular weight):

TABLE 1

| Name | CAS Number | MW |
|---|---|---|
| Benzo(a)anthracene | 56-55-3 | 228.29 |
| Benzo(a)pyrene | 50-32-8 | 252.31 |
| Benzo(e)pyrene | 192-97-7 | 252.31 |
| Benzo(b)fluoranthene | 205-99-2 | 252.31 |
| Benzo(j)fluoranthene | 205-82-3 | 252.31 |
| Benzo(k)fluoranthene | 207-08-9 | 252.31 |
| Chrysene | 218-01-9 | 228.29 |
| Dibenzo(a,h)anthracene | 53-70-3 | 278.35 |
| Naphthalene | 91-20-3 | 128.17 |
| Acenaphthylene | 208-96-8 | 152.19 |
| Acenaphthene | 83-32-9 | 154.21 |
| Fluorene | 86-73-7 | 166.22 |
| Phenanthrene | 85-01-8 | 178.23 |
| Anthracene | 120-12-7 | 178.23 |
| Fluoroanthene | 206-44-0 | 202.35 |
| Pyrene | 129-00-0 | 202.35 |
| Benzo(g,h,i)perylene | 191-24-2 | 276.33 |
| Indeno(1,2,3-cd)pyrene | 193-39-5 | 276.33 |
| Cyclopenta(c,d)pyrene | 27208-37-3 | 226.27 |
| Benzo(g,h,i)fluoranthene | 203-12-3 | 226.30 |
| Perylene | 198-55-0 | 252.31 |
| Anthanthrene | 191-26-4 | 276.33 |
| Coronene | 191-07-1 | 300.35 |

Spills may also involve organic or biochemical compounds that are derived from petroleum only remotely (e.g., fine or specialty chemicals) or not at all (e.g., natural synthetic products). Such compounds may leak into the marine environment through faulty or ruptured transport tanks or underwater pipes, through accidental discharges from industrial or commercial facilities or under other circumstances. If immiscible with water, such compounds also are considered herein as being capable of forming an "oil spill".

If desired, the chemical composition of an oil spill can be determined, e.g., by analytical techniques. In the case of a ruptured oils well, for example, established test protocols exist for alkylated polycyclic aromatic hydrocarbons, often referred to as alkylated PAH; petroleum hydrocarbons or PHC, e.g., alkane fraction; volatile organic compounds, often abbreviated as VOC, such as benzene, toluene, ethylbenzene, and xylenes (BTEX), other alkylated benzenes, straight chain or branched alkanes, alkenes, alkynes, for instance compounds in the C5 to C13 range, and so forth. Other analytical techniques may be used, adapted or developed to ascertain the composition of an oil spill.

Spill composition may influence the behavior, weathering and fate of the oil after being discharged into the marine environment. Factors to be considered here include but are not limited to the volatility of hydrocarbons into the air from the oil, solubility of toxic components into seawater from the slick and dispersed oil, formation and stability of emulsions, rate of natural oil dispersion, persistence, adherence to surfaces ("stickiness"), physical state, and rate of natural biodegradation. Certain oils, for instance, tend to become more "sticky" as they weather and have a greater tendency to adhere to surfaces such as animal skins, fur, hair or feathers. While some liquid oils will form solid waxes very quickly (e.g., after a few hours of weathering at sea), others will leave little residue; yet other oils may be characterized by persistent levels of hydrocarbons.

Ambient wind and/or water conditions also can impact the behavior of the spill. Warmer seas or high winds, for example, may promote evaporation and can be an important mechanism for the removal of lighter aromatics.

The size of oil spills can vary, from relatively minor spills to huge spills that can affect vast areas of ocean or coastline, as does their time frame. In some cases oil spills terminate relatively rapidly once the contents of a contained source such as an oil tanker empty into the marine environment. With ruptured oil wells or other equipment used in underwater drilling, oil can be ejected into the marine environment for days, weeks, months or longer.

In many of its aspects the invention relates to the treatment of oil spills in a marine environment using carbon black. In specific embodiments the carbon black acts as an emulsifier to stabilize oil-in-seawater emulsions. The surface of the carbon black can promote adsorption or absorption of oil components. In further aspects, the invention relates to carbon black stabilized oil-seawater emulsions.

Generally, carbon blacks are produced in a furnace-type reactor by pyrolyzing a hydrocarbon feedstock with hot combustion gases to produce combustion products containing particulate carbon black. Other carbon blacks include thermal blacks, channel blacks, gas blacks, lamp blacks and acetylene blacks. Carbon black exists in the form of aggregates, which, in turn, are formed of carbon black primary particles. In most cases, carbon black primary particles do not exist independently of the carbon black aggregate. Properties of a given carbon black typically depend upon the conditions of manufacture and may be altered, e.g., by changes in temperature, pressure, feedstock, residence time, quench temperature, throughput, and other parameters.

Carbon blacks can be characterized on the basis of analytical properties, including, but not limited to particle size and specific surface area; aggregate size, shape, and distribution; and chemical and physical properties of the surface. The properties of carbon blacks are analytically determined by tests known to the art. For example, statistical thickness surface area (STSA), a measure of surface area, is determined by nitrogen adsorption following ASTM test procedure D-5816. The Iodine number can be measured using ASTM D-1510. Carbon black "structure" describes the size and complexity of aggregates of carbon black formed by the fusion of primary carbon black particles to one another. As used here, the carbon black structure can be measured as the dibutyl phthalate adsorption (DBPA) value for the uncrushed carbon black (DBP), expressed as milliliters of DBPA per 100 grams carbon black, according to the procedure set forth in ASTM D2414.

Suitable carbon blacks can have a STSA within the range of from about 20 to about 1000 $m^2$/gm, e.g., within the range of from about 20 $m^2$/gm to about 800 $m^2$/gm. In certain examples, the carbon black has a STSA of at least about 100 $m^2$/gm, e.g., at least about 150 $m^2$/gm, to, for instance, about 350, 400, 500 or 600 to about 700 $m^2$/gm for oxidized or surface modified carbon blacks. The DBPA may be between 29 mL/100 g and 300 mL/100 g, for instance between 30 mL/100 g and 200 mL/100 g, 30 mL/100 g and 250 mL/100 g, such as between 40 mL/100 g and 200 mL/100 g, e.g., between 50 mL/100 g and 180 mL/100 g or between 50 mL/100 g and 150 mL/100 g, such as between 50 and 100 mL/100 g.

Specific examples described herein employ carbon black having relatively small aggregate size, for instance, less than about 300-400 nanometers (nm). Typical mean or average particle sizes that can be utilized are within the range of from about 50 nm to about 300 nm, e.g., from 75 nm to about 250 nm, such as from about 75 nm to about 200 nm. In one example, the particle size is within the range of from about 100 to about 175 nm. In another example the particle size is within the range of from about 100 nm to about 150 nm. In a further example, the particles utilized have a mean or average particle size of about 125 nm.

Regarding shape, carbon black particles typically are fractal objects, with primary particle size typically about 20 nm.

Carbon blacks having suitable properties for use in the present invention may be selected and defined by the ASTM standards (see, e.g., ASTM D 1765-03 Standard Classification System for Carbon Blacks Used in Rubber Products), by Cabot Corporation specifications (see, Web site www.cabot-corp.com), or other commercial grade specifications.

Various types of carbon black can be utilized. Exemplary carbon blacks include but are not limited to ASTM N100 series to N900 series carbon blacks, for example N100 series carbon blacks, N200 series carbon blacks, N300 series carbon blacks, N700 series carbon blacks, N800 series carbon blacks, or N900 series carbon blacks.

The carbon black can be one or a combination of carbon blacks. Suitable grades of carbon black, such as from Cabot Corporation, Columbian Chemicals, Birla Carbon, or Evonik Degussa GmbH, can have surface properties such as those described above. Exemplary commercially available carbon blacks include but are not limited to carbon blacks sold under the Regal®, Black Pearls®, Spheron®, Sterling®, and Vulcan® trademarks available from Cabot Corporation, the Raven®, Statex®, Furnex®, and Neotex® trademarks and the CD and HV lines available from Columbian Chemicals, and the Corax®, Durax®, Ecorax®, and Purex® trademarks and the CK line available from Evonik (Degussa) Industries.

The carbon black can be a furnace black, channel black, lamp black, thermal black, acetylene black, plasma black, a short quench furnace carbon black, a carbon product containing silicon-containing species, and/or metal containing species and the like. For purposes of the present invention, a short quench carbon black is a carbon black formed by a process wherein the carbon black, after formation from pyrolysis, is subjected a short quench to stop the carbon black forming reactions. The short quench is a parameter of the furnace carbon black manufacturing process that assures the value of the CB Toluene Discoloration (tested per ASTM D1618) of 95%, or lower. Examples of available short quench carbon blacks include, but are not limited to, Vulcan® 7H carbon black, Vulcan® J carbon black, Vulcan® 10H carbon black, Vulcan® 10 carbon black, Vulcan® K carbon black, Vulcan® M carbon black, and N-121 carbon black.

In some implementations, the carbon black utilized contains small molecules and/or polymers, either ionic or nonionic, that are adsorbed on its surface. These adsorbed substances may provide hydrophilic characteristics to an unmodified carbon black and the resulting carbon black particles may exhibit both hydrophobic and hydrophilic characteristics.

In other implementations, the carbon black has functional groups (e.g., derived from small molecules or polymers, either ionic or nonionic) that are directly attached to its surface. Examples of functional groups that can be directly attached (e.g., covalently) to the surface of the carbon black particles and methods for carrying out the surface modification are described, for example, in U.S. Pat. No. 5,554,739 issued to Belmont on Sep. 10, 1996 and U.S. Pat. No. 5,922,118 issued to Johnson et al. on Jul. 13, 1999, the teachings of both being incorporated herein by reference in their entirety. As one example, a surface modified carbon black that can be employed here is obtained by treating carbon black with diazonium salts formed by the reaction of either sulfanilic acid or para-amino-benzoic acid with HCl and $NaNO_2$. The level of surface modification can be tuned to obtain a balance between the hydrophobic and hydrophilic character of the particle.

Other carbon black having functional groups attached to its surface that is suitable for use herein is described in U.S. Pat. No. 7,300,964, issued to Niedermeier, et al, on Nov. 27, 2007.

Oxidized (modified) carbon black, such as described, for example, in U.S. Pat. No. 7,922,805 issued to Kowalski, et al. on Apr. 12, 2011, and in U.S. Pat. No. 6,471,763 issued to Karl on Oct. 29, 2002, and incorporated herein by reference in their entirety, also can be utilized, as can carbon blacks with no chemical modification of the carbon black surface after formation of the carbon black particle. An oxidized carbon black is one that that has been oxidized using an oxidizing agent in order to introduce ionic and/or ionizable groups onto the surface. Oxidized carbon blacks prepared in this manner have been found to have a higher degree of oxygen-containing groups on the surface. Oxidizing agents include, but are not limited to, oxygen gas, ozone, peroxides such as hydrogen peroxide, persulfates, including sodium and potassium persulfate, hypohalites such a sodium hypochlorite, oxidizing acids such a nitric acid, and transition metal containing oxidants, such as permanganate salts, osmium tetroxide, chromium oxides, or ceric ammonium nitrate. Mixtures of oxidants may also be used, particularly mixtures of gaseous oxidants such as oxygen and ozone. Other surface modification methods, such as chlorination and sulfonylation, may also be employed to introduce ionic or ionizable groups.

Examples of commercially available chemically oxidized carbon blacks (modified using a chemical treatment to increase the amount of oxygen at the surface) include but are not limited to: Mogul carbon blacks from Cabot Corporation; Black Pearls E, Black Pearls L, Black Pearls 1000, Black Pearls 1300, Black Pearls 1400, and Black Pearls 1500 carbon blacks from Cabot Monarch 1300, Monarch 1000, Monarch 1400, and Monarch 1500 carbon blacks from Cabot Regal 400 and Regal 400R carbon blacks (Cabot Corporation); Mitsubishi 2700, 2400, 2650, and 2350 carbon blacks and carbon blacks identified as MA Raven 5000, Raven 7000, Raven 3500, Raven 1255, Raven 1100, Raven 1080, Raven 1060, Raven 1040, Raven 1035 and Raven 14 carbon blacks from Columbian, and FW200, FW2, FW2V, Special Black 4, Special Black 4A, Special Black 5, Special Black 6, Printex 150 T, Special Black 550, Special Black 350, Special Black 250, and Special Black 100 from Orion Engineered Carbons, formerly Evonik.

Whether adsorbed or used in the formation of surface modified carbon black, the small molecules and/or polymers can be selected to enhance properties of the carbon black that are important in the applications described below.

Relative to a carbon black product where small molecules and/or polymers are merely adsorbed, a surface modified one (where the attachment to the surface of the carbon black particles is by covalent bonding), may reduce or minimize the risk of introducing additional toxicity to the marine environment.

In specific implementations, the type of carbon black used is selected to provide good colloidal stability. Examples include some surface modified carbon blacks, e.g., p-amino benzoic acid treated and sulfanilic acid treated carbon black.

Other factors that may play a role in how much an oil-seawater emulsion will be stabilized are the shape and/or the size of carbon black particles.

In the context of oil-seawater emulsions, one important factor to consider is the degree of hydrophobicity of the carbon black particles. Generally, hydrophilic materials have high affinity for water, they are usually self-dispersible in aqueous solutions; hydrophobic materials on the other hand have low affinity for or "dislike" water and preferentially disperse in an "oil" phase. In many embodiments of the invention, the particles employed for seawater emulsion stabilization are particles that have some of each functionality (hydrophilic and hydrophobic) so that they are thermodynamically or kinetically stable at the oil-water interface. In specific implementations, the carbon black is at least partially hydrophobic and at least partially hydrophilic and thus compatible with both the oil and the aqueous phase. In other implementations, the carbon black displays partial hydrophilicity and partial hydrophobicity in the same particle.

The contact angle of the particle to the surface of the droplet is a characteristic of its hydrophobicity. If the contact angle of the particle measured through the sea water (oil) is low, the particle will be more likely to partition to the sea water (oil) and may not prevent coalescence of the droplets. Particles that are partially hydrophobic (i.e. contact angle of approximately 90°) are better stabilizers because they are partially wettable by both liquids in the emulsion and therefore bind better to the surface of the droplets. Good or adequate stabilization also can be obtained with contact angles that are, for example, between 60 to 120°, such as, for instance, 70 to 110°, e.g., between 75 to 105° or between 80 to 100°. Surface modified (e.g., by sulfanilic or para-amino-benzoic acid processes using diazonium salts, protonation or other surface modifications) or oxidized carbon blacks are examples of particulate materials in which a given particle can have both a hydrophobic and hydrophilic character.

In one example, the degree of hydrophobicity of the carbon black particles is adjusted by manipulating the pH of an aqueous suspension used to provide carbon black particles. For instance, the carbon black surface is partially protonated to lower the pH, raising somewhat the viscosity of the carbon black suspension and indicating partial hydrophobicity of the particles.

The fractal nature of carbon black introduces edges and cups to the morphology of the particles. Pinning of particles at such locations may provide a mechanism for additional stability (beyond smooth surfaces) of carbon black at the oil-sea water interfaces.

Carbon black can be provided in various forms, including powders. In specific embodiments, a carbon black and in particular a surface modified carbon black is provided as a dispersion in water or as a slurry in water or in another suitable medium. In one example, the dispersion has an overall hydrophilic character obtained, for instance, by surface modification of the carbon black with diazonium salts of sulfanilic or para-amino-benzoic acid.

Dispersions may further include surfactants and/or dispersants added, e.g., to enhance the colloidal stability of the composition. Anionic, cationic and nonionic dispersing agents can be used.

Representative examples of anionic dispersants or surfactants include, but are not limited to, higher fatty acid salts, higher alkyldicarboxylates, sulfuric acid ester salts of higher alcohols, higher alkyl-sulfonates, alkylbenzenesulfonates, alkylnaphthalene sulfonates, naphthalene sulfonates (Na, K, Li, Ca, etc.), formalin polycondensates, condensates between higher fatty acids and amino acids, dialkylsulfosuccinic acid ester salts, alkylsulfosuccinates, naphthenates, alkylether carboxylates, acylated peptides, .alpha.-olefin sulfonates, N-acrylmethyl taurine, alkylether sulfonates, secondary higher alcohol ethoxysulfates, polyoxyethylene alkylphenylether sulfates, monoglycylsulfates, alkylether phosphates and alkyl phosphates, alkyl phosphonates and bisphosphonates, including hydroxylated or aminated derivatives. For example, polymers and copolymers of styrene sulfonate salts, unsubstituted and substituted naphthalene sulfonate salts (e.g. alkyl or alkoxy substituted naphthalene derivatives), aldehyde derivatives (such as unsubstituted alkyl aldehyde derivatives including formaldehyde, acetaldehyde, propylaldehyde, and the like), maleic acid salts, and mixtures thereof may be used as the anionic dispersing aids. Salts include, for example, $Na^+$, $Li^-$, $K^-$, $Cs^+$, $Rb^+$, and substituted and unsubstituted ammonium cations. Specific examples include, but are not limited to, commercial products such as Versa®4, Versa®7, and Versa®77 (National Starch and Chemical Co.); Lomar®D (Diamond Shamrock Chemicals Co.); Daxad®19 and Daxad®K (W. R. Grace Co.); and Tamol®SN (Rohm & Haas). Another suitable anionic surfactant is Aerosol®OT (sodium dioctyl sulfosuccinate), available from Cytec Industries Inc.

Representative examples of cationic surfactants include aliphatic amines, quaternary ammonium salts, sulfonium salts, phosphonium salts and the like.

Representative examples of nonionic dispersants or surfactants include fluorine derivatives, silicone derivatives, acrylic acid copolymers, polyoxyethylene alkyl ether, polyoxyethylene alkylphenyl ether, polyoxyethylene secondary alcohol ether, polyoxyethylene styrol ether, ethoxylated acetylenic diols (such as Surfynol®420, Surfynol®440, and Surfynol®465, available from Air Products), polyoxyethylene lanolin derivatives, ethylene oxide derivatives of alkylphenol formalin condensates, polyoxyethylene polyoxypropylene block polymers, fatty acid esters of polyoxyethylene polyoxypropylene alkylether polyoxyethylene compounds, ethylene glycol fatty acid esters of polyethylene oxide condensation type, fatty acid monoglycerides, fatty acid esters of polyglycerol, fatty acid esters of propylene glycol, cane sugar fatty acid esters, fatty acid alkanol amides, polyoxyethylene fatty acid amides and polyoxyethylene alkylamine oxides. For example, ethoxylated monoalkyl or dialkyl phenols may be used, such as Igepal® CA and CO series materials (Rhone-Poulenc Co.), Brij® Series materials (ICI Americas, Inc.), and Triton® series materials (Dow Company). These nonionic surfactants or dispersants can be used alone or in combination with the aforementioned anionic and cationic dispersants.

The dispersing agents may also be a natural polymer or a synthetic polymer dispersant. Specific examples of natural polymer dispersants include proteins such as glue, gelatin, casein and albumin; natural rubbers such as gum arabic and tragacanth gum; glucosides such as saponin; alginic acid, and alginic acid derivatives such as propyleneglycol alginate, triethanolamine alginate, and ammonium alginate; and cellulose derivatives such as methyl cellulose, carboxymethyl cellulose, hydroxyethyl cellulose and ethylhydroxy cellulose. Specific examples of polymeric dispersants, including synthetic polymeric dispersants, include polyvinyl alcohols, such as Elvanols from DuPont, Celvoline from Celanese, polyvinylpyrrolidones such as Luvatec from BASF, Kollidon and Plasdone from ISP, and PVP-K, Glide, acrylic or methacrylic resins (often written as "(meth)acrylic") such as poly (meth)acrylic acid, Ethacryl line from Lyondell, Alcosperse from Alco, acrylic acid-(meth)acrylonitrile copolymers, potassium (meth)acrylate-(meth)acrylonitrile copolymers, vinyl acetate-(meth)acrylate ester copolymers and (meth) acrylic acid-(meth)acrylate ester copolymers; styrene-acrylic or methacrylic resins such as styrene-(meth)acrylic acid copolymers, such as the Joncryl line from BASF, Carbomers from Noveon, styrene-(meth)acrylic acid-(meth)acrylate ester copolymers, such as the Joncryl polymers from BASF, styrene-.alpha.-methylstyrene-(meth)acrylic acid copolymers, styrene-.alpha.-methylstyrene-(meth)acrylic acid-(meth)acrylate ester copolymers; styrene-maleic acid copolymers; styrene-maleic anhydride copolymers, such as the SMA polymers from Sartomer, vinyl naphthalene-acrylic or methacrylic acid copolymers; vinyl naphthalene-maleic acid copolymers; and vinyl acetate copolymers such as vinyl acetate-ethylene copolymer, vinyl acetate-fatty acid vinyl ethylene copolymers, vinyl acetate-maleate ester copolymers, vinyl acetate-crotonic acid copolymer and vinyl acetate-acrylic acid copolymer; and salts thereof. Polymers, such as those listed above, variations and related materials, that can be used for dispersants are included in the Tego products from Degussa, the Ethacryl products from Lyondell, the Joncryl polymers from BASF, the EFKA dispersants from Ciba, and the Disperbyk and Byk dispersants from BYK Chemie.

Dispersions that contain materials that are biodegradable and/or present little or no harm to marine life are preferred.

Carbon black dispersions that can be used to supply carbon black to form oil-seawater emulsions can be characterized by parameters such as: amount of solids present, viscosity, pH, particle size, appearance and so forth. The dispersion may contain from about 5% to about 30%, for example from about 10 to about 25% such as from about 15 to about 20% by weight, carbon black. In one implementation, the dispersion has 15% by weight carbon black. In others, a water suspension includes 8, 10, 12 or 14% by weight carbon black.

The pH of the dispersion may be adjusted, for example, to a pH between 7.5 and 9.5, for instance between 7.8 and 9, e.g., between 7.8 and 8.5, and in some cases between 8.0 and 8.5, by dialyzing the carbon black dispersion. This technique both removes impurities from the dispersion and can also adjust the pH of the dispersion by adjusting the degree of ionization of the surface ionizable groups (e.g., COOH versus COO$^-$ Na$^+$). The degree of surface treatment and of ionization of the carbon black may be adjusted to control the pH of the dispersion and the general hydrophilic/lipophilic balance of the carbon black. Particle size may be controlled by sonication.

One illustrative example uses a dispersion of para-aminobenzoic acid treated high surface area carbon black. Another illustrative example uses a dispersion of sulfanilic acid treated high surface area carbon black. Both are produced by the diazonium process described, for example, in U.S. Pat. No. 5,922,118. Other suitable carbon black dispersions include the dispersions described in U.S. Pat. No. 6,503,311 issued to Karl, et al., on Jan. 7, 2003 and U.S. Pat. No. 6,451,100 issued to Karl, et al, on Sep. 17, 2002.

Many carbon black dispersions that can be utilized herein are commercially available, for example from Cabot Corporation, Boston, Mass. and other suppliers. If desired, dispersions also can be prepared by techniques known in the art.

In some implementations, carbon black is utilized in combination with a fluid, e.g., a liquid carrier. Mixtures of carbon black with a carrier are referred to herein as "slurries". Suitable amounts of carbon black in the slurry can depend on the specific marine application and can be easily determined by a person skilled in the art. In one example, carbon black is provided in a 15% by weight suspension in water. Other amounts can be used.

In specific examples, the carrier is water, e.g., fresh or seawater. Other suitable carriers also can be employed. Typically, the carbon black, the fluid carrier and, optionally, other ingredients can form a multi-, e.g., two-phase system.

Carbon black can be provided in combination with other types of particles such as another kind of carbon black or one or more non-carbon black particulate material(s). Selected carbon blacks, for example carbon blacks having an effective amount of surface hydrophilic modification, can be combined, e.g., blended, with other (e.g., unmodified) carbon blacks or other materials such as, for example, colloidal silica, precipitated silica, unmodified fumed silica, typically made by a pyrogenic process, hydrophobically modified fumed, colloidal, or precipitated silica, clays, aluminas, titania, zirconia, unmodified carbon black, any combination thereof, and other suitable particulate materials.

Particle mixtures can be selected to balance the absorbant or adsorbant properties of carbon black's hydrophobic particle surface with the emulsifying properties of modified carbon black and/or other particles. Amounts utilized can vary. In many cases, the non-carbon black material(s) or particles, also referred to herein as "secondary" material(s) or particles, are present in the blend in minor amounts, i.e., less than 50%, e.g., within the range of from about 1% to about 49%, for instance, from about 5% to about 45%, or from about 10% to about 40%, for example from about 15% to about 35%, such as from about 20% to about 30% by total weight of particles. In other cases, it is the carbon black, e.g., surface modified, that is present in a minor amount, e.g., within the range of from about 1% to about 49%, for instance, from about 5% to about 45%, or from about 10% to about 40%, for example from about 15% to about 35%, such as from about 20% to about 30% by total weight of particles.

When silica is utilized with carbon black particles, unmodified fumed silica particles (i.e., made via a pyrogenic process) can be useful to stabilize emulsions e.g., for short term. In many cases, hydrophobic modified silica particles are preferred for longer term emulsion stability. In combinations of carbon black and silica, one or both types of particles can be surface modified to help stabilize emulsions having desired properties such as, for example, the amount of particles being used, droplet size and/or stability, and so forth.

Untreated silica particles typically are hydrophilic and can be treated with an agent that associates with or covalently attaches to the silica surface, e.g., to add some hydrophobic characteristics. Silica treating agents can be any suitable silica treating agent and can be covalently bonded to the surface of the silica particles or can be present as a non covalently bonded coating. Typically, the silica treating agent is bonded either covalently or non covalently to silica.

In certain cases, the silica treating agent can be a silicone fluid, for example a non functionalized silicone fluid or a functionalized silicone fluid, hydrophobizing silanes, functionalized silanes, silazanes or other silica treating agents, e.g., as known in the art.

Examples of alkoxysilanes and silazanes suitable for treating fumed or colloidal silicas are described in U.S. Patent Application Publication No. 2008/0070146 to Fomitchev et al., published on Mar. 20, 2008, incorporated herein by reference in its entirety. U.S. Pat. No. 7,811,540, issued Oct. 12, 2010 to Adams and incorporated herein by reference in its entirety, describes silyl amines that can be utilized in treating fumed or colloidal silicas. In certain embodiments, the silica-treating agent comprises a charge modifying agent such as one or more of those disclosed in U.S. Patent Application Publication 2010/0009280 to Liu et al., published on Jan. 14, 2010, the contents of which are incorporated herein by reference. Alternatively or in addition, the dimethylsiloxane copolymers disclosed in U.S. patent application Ser. No. 12/798,540, filed Apr. 6, 2010, the content of which is incorporated herein by reference, may be used to treat silica particles.

Silicas used preferably are treated with agents that present little or no harm to the marine environment and/or are biodegradable.

In some implementations, the carbon black materials are provided in conjunction with microorganisms or other means designed to consume the oil. For instance, oil-eating bacteria can be provided in a carbon black slurry or can be adsorbed or otherwise attached to carbon black particles. In other implementations, nutrients such as nitrogen and phosphorous can be provided with the carbon black to encourage the growth of naturally occurring oil-eating bacteria. Components designed to enhance consumption of the oil in the oil spill also can be provided with the secondary material(s) if blends of particles are being utilized.

In many instances, oils spills that occur in a marine environment form oil-seawater emulsions under the action of wind, tides, surf, currents and so forth. Also, some rupture events can cause the discharged oil to be ejected in a manner that promotes formation of oil in seawater emulsions.

Generally, an emulsion is a mixture of two or more immiscible liquids, wherein droplets of one liquid are dispersed within the other. When two immiscible liquids are combined, without additional components or vigorous mixing, they will segregate into separate phases. If the two liquids are vigorously mixed, they will briefly form an unstable emulsion before re-segregating into separate phases.

Common types of emulsion instability include flocculation, creaming, and coalescence. During flocculation, for example, the dispersed phase droplets contact each other and combine thus coming out of suspension. Emulsions that undergo creaming are characterized by the migration of one of the substances to the top (or the bottom, depending on the relative densities of the two phases) of the emulsion under the influence of buoyancy or centripetal force when a centrifuge is used. During coalescence small droplets combine to form progressively larger ones.

Emulsifiers are agents used to stabilize emulsions. Typically, emulsifiers that stabilize oil-in-water emulsions have hydrophobic groups that interact with oil and hydrophilic groups that interact with water. The emulsifier forms a layer surrounding the oil droplets in the water, wherein the hydrophobic region of the emulsifier is in contact with the oil droplet and the hydrophilic region is in contact with the water, thereby stabilizing the oil droplets.

In many aspects of the invention, particles adsorb essentially irreversibly at an interface. When enough particles adsorb at an interface, they are jammed and particle motion along the oil-water interface is highly retarded. Since drop-drop coalescence would require particles to be displaced from the interfaces into one of the bulk phases, which is energetically unfavorable, these emulsions remain stable. As a result, particle stabilized emulsions can have significantly longer lifetimes than those stabilized by surfactants.

Oil-seawater emulsions can have droplets (also referred to herein as drops) that vary in size. Within one area, droplets formed may vary in size by as much as about 1 micron to 200 microns, for example by about 100 microns. In many cases, oil-seawater emulsions found or formed during oil spills will have a droplet average diameter within the range of from about 10 microns to about 200 or even 300 microns, for example within the range of from about 20 microns to about 200 microns, such as from about 50 to about 150 microns. In one example, the droplets have a diameter within a range of from about 10 to about 100 microns.

In some of its aspects, the invention relates to an emulsion including one or more oil spill components, seawater and carbon black particles. Typically, the emulsion will form spherical droplets. As one illustrative example, an octane-in-water emulsion, stabilized by carbon black, is shown in FIG. 1. In some examples, the carbon black particles are disposed in layers (two or more) around oil droplets.

In a natural environment it is often desirable to minimize the amount of foreign materials introduced during clean-up operations. Even when considered benign to marine life, substances used may still need to be removed in order to complete the environmental remediation. Using only the amounts effective to form and/or maintain the oil-seawater emulsions described herein, with little or no excess carbon black, can facilitate subsequent processing and alleviate any concerns about using carbon black in the first place. Thus in specific aspects of the invention the concentration of carbon black in the emulsion is relatively low, i.e., below about 5% by weight of the water phase of the emulsion.

In many cases, the concentration of carbon black in the emulsion is no greater than about 4%, 3%, 2%, or 1%, based on the total weight of the emulsion. In specific embodiments, the carbon black concentration is within the range of from about 0.001% to about 4%, e.g., from about 0.002% to about 0.007%, from about 0.005% to about 0.01%, or from about 0.01% to about 1%, for instance about 0.015% by weight of the water phase of the emulsion.

To prepare the emulsion, carbon black particles, e.g., surface modified or oxidized, are combined with an oil-seawater mixture. For example, carbon black particles are added to oil-seawater droplets. In the marine environment described herein, the effective density of the emulsion drop can be brought close to that of the surrounding seawater, thus reducing the buoyancy-driven motion of oil towards the surface. In other cases, the density of the drop is tailored to allow droplets to rise to the surface.

In specific embodiments, the particle stabilized emulsion does not release its oil component until the latter is at least partially (e.g., 20, 25, 35, 50% or more) degraded. As used herein, the term "degraded" describes any process by which an oil spill component is removed from the marine environment. Example of such processes include but are not limited to chemical decompositions, often to less harmful compounds, consumption by microorganisms, e.g., bacteria, and so forth. In specific embodiments, the oil-in-water emulsion is stabilized in the water column for at least one month, e.g., for one to two months or longer.

Carbon black can be combined with an oil spill in any suitable amount, e.g., an amount determined by experiment or calculation to emulsify at least part of the oil present or of a component thereof.

Carbon black particles can be used to treat surface or subsurface oil spills and the free energy of particle desorption from an oil/seawater interface can be tuned to at least one thousand, typically several thousand kT/particle. Thus when supplied at an oil spill site where an oil-seawater emulsion is present or can be created, carbon black, provided, e.g., in a fluid carrier, can form a stable layer around oil droplets, thus stabilizing the emulsion and allowing further degradation of the oil. In other words, the stable layer of carbon black surrounding an oil droplet prevents or minimizes the premature release of the oil, e.g., before it is degraded. In a subsurface oils spill, for example, the materials described herein can contain the oil spill by emulsification of the oil close to the source and keeping the oil suspended as droplets in the water column long enough for bacteria to consume the oil.

In some embodiments, the effective density of the particle stabilized emulsion droplet is brought close to that of the surrounding seawater, thus reducing the buoyancy-driven motion of oil towards the surface. In others, the density of the drop is tailored to allow droplets to rise to the surface.

The particle stabilized emulsions described herein are particularly useful in preventing or suppressing polycyclicaromatic (PAH) and in particular lower molecular weight polycyclicaromatic hydrocarbons from partitioning into the seawater. Examples of low molecular weight polycyclicaromatic hydrocarbons include but are not limited to coronene, fluoranthene, acenaphthylene, cyclopenta(cd)pyrene, anthanthrene, and indenopyrene. Higher molecular weight polycyclicaromatic hydrocarbons include but are not limited to: pyrene, naphthalene, methyl naphthalene, dimethylnapthalene, benzo(e)pyrene, benzo(ghi)fluoranthene, or 1,12 benzperylene. Use of high specific surface area particles can promote adsorption of significant amounts of polycyclicaromatic hydrocarbons and/or other components from the oil spill, thus retarding their dissolution into the surrounding marine environment.

Without wishing to be held to a particular mechanism, it is believed that using carbon blacks with sufficient specific surface area promotes absorption or adsorption of spill oil components such as PAH compounds; and stabilization is promoted by a carbon black (aggregate) particle size that is not too large relative to the desired oil droplet size in the emulsion. Thus in certain implementations, the carbon black (aggregate) particle has a STSA of at least about 100 $m^2/g$, preferably at least about 160 $m^2/g$, and an aggregated particle size of less than about 400 nanometers, e.g., less than about 300 nanometers.

In many instances, surface modified carbon blacks such as those described above will not require additional dispersants such as typically used in treating or controlling oil spills. In others, carbon black can be used in conjunction with other dispersants, with the latter being added, for example, before, e.g., to promote or enhance formation of the initial oil-seawater emulsion, during, or after the carbon black delivery to the oil spill. In some cases, additional dispersants can be combined with the carbon black-carrier mixture. In other cases, separate injection points are provided for the carbon black (and optional carrier) stream and the additional dispersant stream. As used herein, terms such as "other" or "additional" dispersants refers to compounds that might be added in addition to a carbon black-containing dispersion. Generally, other or additional dispersants are those suitable for use in oil spills, and include but are not limited to surfactant-based dispersants such as those known in the art, for example Corexit® available from Nalco Company.

In most cases, the emulsion is formed by relying on natural mixing caused, for example, by wind, currents, surf and/or other conditions naturally present at the site of the oil spill. In addition to naturally occurring mixing at the source, other techniques can be used to produce or enhance the formation of the emulsion. Examples involve generating shear or turbulence, by using, for instance, mechanical means such as agitators, mixers, aerators, impellers, spargers, nozzles, wave machines and so forth, or combinations thereof. Dispersants or other suitable chemical compounds can be used in addition or alternatively. Formation of the oil-seawater emulsion can be conducted concurrently with the delivery of carbon black particles.

Adding carbon black to sub-surface oil spills, for instance to oil being discharged, can be conducted with underwater robots, submarines, pipes, underwater drilling equipment, and so forth. Remote control techniques such as those known in the art also can be employed. Carbon black, optionally in a carrier fluid, can be injected to the subsurface site through pipe orifices, nozzles, spargers, diffusers and other suitable means. In addition to natural means of generating turbulence, agitators, impellers and/or other mixing devices can be used to produce or increase turbulence, creating, enhancing or maintaining oil droplets in the seawater medium.

To treat surface oil spills, carbon black, optionally in a carrier fluid, can be sprayed or otherwise delivered onto the surface of an oil slick using boats, barges, planes, helicopters, remote control delivery systems, and so forth. In some cases, oil spills on a marine surface can be segregated into separate phases, with large areas of oil coalesced over the seawater. Shear or turbulence can enhance formation of oil droplets, facilitating the emulsifying process. The process can rely, at least in part, on the natural action of waves, surf, currents, rip tides, wind and the like. Mechanical means, such as agitators, mixers, impellers, spargers, nozzles, wave generators and/or other suitable means, e.g., chemical dispersants, also can be employed.

Embodiments of the invention are further illustrated in the following non-limiting examples.

EXEMPLIFICATION

Example 1

This example was carried out to study the stabilization of an octane-in-water emulsion with a surface treated carbon black.

A sodium salt of p-aminobenzoic acid-modified CB having a BET specific surface area of 200 $m^2/g$ (CAS Number 1106787-35-2; carbon black, (4-carboxyphenyl)-modified sodium salt) was dispersed at 15 wt % in water. The pH of the dispersion was 8.5. The mean particle size of the carbon black was 0.130 microns.

The surface of the carbon black was partially protonated by lowering the pH until the suspension viscosity rose marginally, indicating partial hydrophobicity of the particles.

The dispersion was diluted to 0.015 weight %. Octane was then added to make an approximately 2:1 v/v aqueous-organic mixture, which was vortex mixed for 15 minutes to create an emulsion. The octane optionally contained pyrene to allow for visualization of octane by fluorescence microscopy.

Figures 2A, 2B, 2C, 2D:
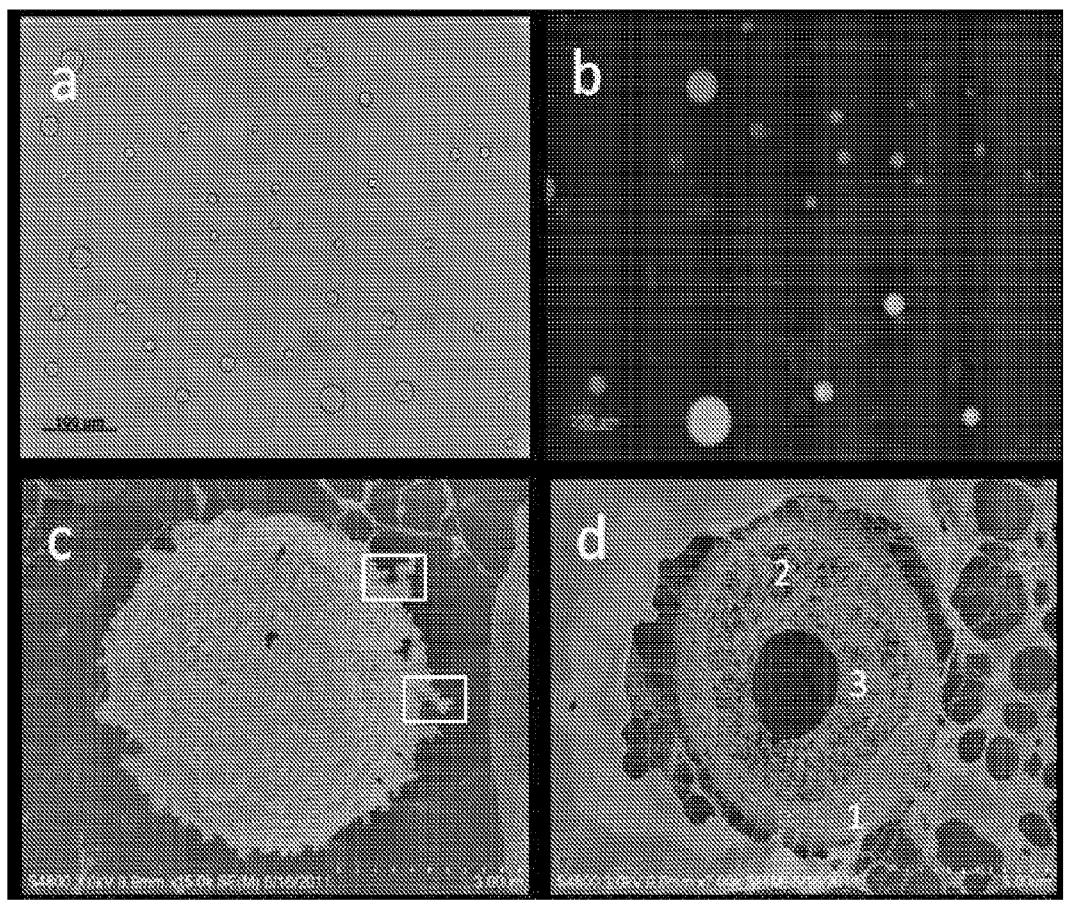
FIG. 2(a) is an optical micrograph of emulsion drops of sizes between 10-100 mm formed by using carbon black.
FIG. 2(b) is an optical micrograph of an octane-in-water emulsion with fluorescence emitted only from the droplets.
FIG. 2(c) is a cryogenic scanning electron microscopy (cryo-SEM) image showing coverage by carbon black particles. Some particles protrude from the drop.
FIG. 2(d) is a cryo-SEM image identifying more clearly the layers seen of the system shown in FIG. 2(c).

The resultant octane-in-water emulsion is visualized in FIGS. 2(a)-2(d). FIG. 2(a) is a bright-field micrograph of the emulsion. Droplets formed are clearly visible and are between 10-100 μm in diameter. FIG. 2(b) is a fluorescent micrograph of the emulsion in which pyrene was added to the octane. The co-localization of fluorescence with the droplets confirms that the octane is localized to the droplets. FIG. 2(c) is a cryo-scanning electron microscopy (cryo-SEM) micrograph of a droplet formed by this process. Particles protruding from the droplets are visible. This demonstrates that there are multiple layers of carbon black at the octane-water interface. FIG. 2(d) is also a cryo-SEM micrograph of a droplet formed by this process, wherein the droplet has been fractured allowing visualization of the interior of the droplet. Three distinct layers of carbon black are visible. These images clearly show the formation of an octane-in-water emulsion in which droplets of octane are coated with several layers of carbon black.

The resultant octane-in-water emulsion was centrifuged to destabilize the emulsion and separate it into aqueous and oil phases. This was done with an emulsion containing naphthalene. Since naphthalene remains mostly associated with octane, the PAH composition in each phase can be obtained by measurement of the naphthalene levels with gas chromatography-mass spectrometry (GC-MS). The levels of naphthalene in each phase were compared to that of the same phase in a control sample lacking carbon black. The data, shown in Table 2, demonstrate significant suppression of naphthalene partitioning into the aqueous phase due to the presence of carbon black particles.

TABLE 2

| Experiment | Concentration naphthalene in octane (ppm) | Concentration naphthalene in water (ppm) |
|---|---|---|
| Control | 595.7 | 2.33 |
| Emulsion | 511.03 | 0.85 |

Example 2

Example 2 relates to the formation of crude oil-in-salt water Pickering emulsions using carbon black as a dispersant.

The size distribution and stability of emulsions are explored when a carbon black with no or different surface functionalities and a range of specific surface areas up to 1000 $m^2/gm$) slurry is added to a mixture of crude oil and seawater.

Different mixing conditions are used to conduct experiments over 5° C.-20° C., to mimic 'field' conditions. Room temperature and atmospheric pressure experiments are conducted to provide key insights.

The composition of crude oil at undersea conditions (at 5000 ft, the water pressure is ~180 atm) is expected to be different than that of the oil brought to the surface because of hydrate crystallization and some loss of the lower fraction components. The sodium ions in sea water can bind to the surface of the particles, thus making them partially hydrophobic. These particles can be directly used to stabilize the emulsion. Screening caused by the salt in seawater (~3.5% w/w) may affect carbon black agglomeration leading to a closely packed set of carbon black layers at the oil-water interface. It is believed that ions present in seawater will screen the natural repulsion of carbon black particles, allowing these particles to come closer together than they would in deionized water. Greater stability of the emulsion droplets may be obtained because of these multiple layers of carbon black.

Compared to fresh water emulsions, oil-in-seawater emulsions according to embodiments described herein are expected to be easier to form and to have increased stability, presumably due to the seawater salt content.

Example 3

This example relates to the analysis of polycyclic aromatic hydrocarbon (PAH) partitioning between the oil and aqueous phase and experiments are conducted to examine the partitioning of the low molecular weight PAHs present in the crude oil in the absence of carbon black, and then with varying concentrations of different specific surface area carbon blacks using gas chromatography.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for cleaning an oil spill in a marine environment, the method comprising:
    forming a particle-stabilized emulsion containing seawater, carbon black that is a surface-modified or an oxidized modified carbon black, and at least one oil spill component; and
    allowing the at least one oil spill component to degrade, or the at least one oil spill component to be consumed by bacteria,
thereby removing said component from the marine environment.

2. The method of claim 1, wherein the carbon black is at least partially hydrophobic and at least partially hydrophilic.

3. The method of claim 2, wherein the partial hydrophobicity and partial hydrophilicity are displayed in the same particle.

4. The method of claim 1, wherein the carbon black has a STSA of at least 100 $m^2/g$ and a particle size of less than 400 nanometers.

5. The method of claim 1, wherein the carbon black is surface-modified with diazonium salts of sulfanilic acid or para-amino-benzoic acid.

6. The method of claim 1, wherein the carbon black is provided as carbon black particles in an aqueous dispersion.

7. The method of claim 1, wherein the at least one oil spill component is a polycyclic aromatic hydrocarbon.

8. A method for treating an oil spill, the method comprising:
    adding carbon black that is a surface-modified or an oxidized modified carbon black to an oil-seawater mixture to form a stabilized emulsion containing at least one oil spill component; and
    allowing the at least one oil spill component to degrade, thereby removing the at least one oil spill component from the oil spill.

9. The method of claim 8, wherein the carbon black has a STSA of at least 100 $m^2/g$ and a particle size of less than 400 nanometers.

10. The method of claim 8, wherein the carbon black is surface-modified with diazonium salts of sulfanilic acid or para-amino-benzoic acid.

11. The method of claim 8, wherein the carbon black is provided as carbon black particles in an aqueous dispersion.

12. The method of claim 8, wherein the at least one oil spill component is a polycyclic aromatic hydrocarbon.

13. A particle stabilized oil-in-water emulsion comprising one or more oil spill components, seawater and carbon black particles that are surface-modified or oxidized modified carbon black particles, wherein the surface-modified or oxidized modified carbon black particles contain attached functional groups.

14. The emulsion of claim 13, wherein the carbon black particles are at least partially hydrophobic and at least partially hydrophilic.

15. The emulsion of claim 14, wherein the partial hydrophobicity and partial hydrophilicity are displayed in the same particle.

16. The emulsion of claim 13, wherein the carbon black particles are modified with diazonium salts of sulfanilic acid or para-amino-benzoic acid.

17. The emulsion of claim 13, wherein the carbon black particles are characterized by a STSA of at least 100 $m^2/g$ and a particle size of less than 400 nanometers.

18. The emulsion of claim 13, wherein the carbon black particles are disposed in layers around oil droplets.

19. The emulsion of claim 18, wherein the droplets have a diameter of between 10 and 100 microns.

20. A method for preparing a particle stabilized emulsion, the method comprising combining surface modified or oxidized modified carbon black particles with oil and seawater to form oil droplets in the seawater, wherein the surface modified or the oxidized modified carbon black particles contain attached functional groups.

21. The method of claim 1, wherein the surface-modified or the oxidized modified carbon black contains attached functional groups.

22. The method of claim 8, wherein the surface-modified or the oxidized modified carbon black contains attached functional groups.

23. The method of claim 20, wherein the surface-modified or the oxidized modified carbon black particles are modified with diazonium salts of sulfanilic acid or para-amino-benzoic acid.

24. A particle stabilized oil-in-water emulsion comprising one or more oil spill components, seawater and carbon black particles that are surface-modified or oxidized modified carbon black particles, wherein the particle stabilized oil-in-water emulsion is at a surface or sub-surface of an oil spill in a marine environment.

25. A method for preparing a particle stabilized emulsion, the method comprising combining surface modified or oxidized modified carbon black particles with oil and seawater at an oil spill site in a marine environment, to form oil droplets in the seawater.

* * * * *